Patented June 11, 1929.

1,717,168

UNITED STATES PATENT OFFICE.

REGINALD JAMIESON NOAR, OF PENDLETON, ENGLAND.

MANUFACTURE OF SPONGE RUBBER.

No Drawing. Application filed June 1, 1928, Serial No. 282,274, and in Great Britain July 19, 1927.

This invention relates to the manufacture of sponge rubber. One of its objects is to enable spherical, cylindrical, tubular and other sponge rubber articles of rounded configuration to be made without a mould. Another object is to enable sponge rubber articles to be produced in lengths unlimited by the length of the oven, autoclave or other vessel in which vulcanization is effected. Another object is to avoid or minimize the formation of surface blemishes when the sponge rubber article is vulcanized in a mould.

Briefly the invention consists in the formation of a vulcanized surface on a mass of rubber prepared for the formation of a sponge rubber article prior to the generation within such mass of gas to produce an expanded cellular structure thereof, the surface-vulcanized mass being subsequently hot vulcanized.

The formation of the vulcanized surface on the mass of sponge rubber dough can be effected by any of the well known cold vulcanization processes, such as by surface contact with sulphur chloride vapour or solution, alternate exposure to sulphuretted hydrogen and sulphur dioxide in the gaseous or dissolved form, and the like.

Alternatively, the vulcanized surface can be formed by the hot vulcanization process by heating the sponge rubber dough in contact with a super-accelerator, such as piperidine piperidyl dithio-carbamate or tetramethyl thiuram disulphide, to a temperature at which vulcanization in contact with the super-accelerator will occur but below the temperature at which gas is generated within the dough.

The formation of a vulcanized skin on the sponge rubber dough prior to exposure of the mass to a temperature at which gas is generated within same and vulcanization throughout the mass is effected, enables advantage to be taken of the tendency of an expanding mass restrained at the surface to assume a configuration presenting a large volume with a restricted surface, i. e. to assume a cylindrical or spherical form, or a configuration having a more or less circular or D section. Thus by surface-curing a rod of sponge rubber dough prior to exposure to a temperature at which the porosity-forming gases are generated and homogeneous vulcanization takes place, such surface-cured rod can be subsequently vulcanized by heat without confinement in a mould and on such vulcanization will assume an expanded round section. Were it not for the confinement of the swelling mass by the pre-formed vulcanized skin, the softened rubber dough would flow and the gases would escape and the product would be a ribbon of semi-solid vulcanized rubber, lacking the desired spongy character.

To make a continuous length of sponge rubber cord, sponge rubber dough may be extruded as, or otherwise formed into, a rod which is passed through sulphur chloride or other suitable cold vulcanizing agent to vulcanize the surface of the rod. The rod of sponge rubber dough vulcanized on the surface and coated and surrounded by powdered chalk or other adhesion-preventing substance, is coiled spirally in a pan and, unconfined by a mould, is exposed to a hot vulcanization temperature.

A tube instead of a cord of sponge rubber can be formed by extruding or moulding the sponge rubber dough as a tube, and pre-vulcanizing the exposed outer and preferably also the inner surface of the tube of sponge rubber dough, before coiling and vulcanizing the entire mass as above described. To retain the tubular shape the tube of sponge rubber dough is coiled whilst mounted on a flexible core or mandrel, such as an already vulcanized cord of solid rubber or a wire. The sponge rubber tubing after complete vulcanization is stripped from such flexible mandrel.

Pre-surface-vulcanization of sponge rubber cords, rods or tubes may be effected with a super-accelerator in the powder bed instead of by cold vulcanization.

To make a sponge rubber ball, the sponge rubber dough is formed into a mass as approximately spherical as the exigencies of manufacture will allow, the approximately true spherical configuration being assumed by the mass on vulcanization, under the expansion restrained by the pre-vulcanized surface. For example, from a cylinder of sponge rubber portions equal in length to the diameter of the cylinder are cut and cold surface-vulcanized. The internal pressure exerted by the gases generated on heating to the hot vulcanizing temperature changes the short cylindrical portions into spheres.

To avoid the weight of the mass of rubber causing the ball to be flat on the underside, the hot vulcanization may be effected in a bath of liquid inert to rubber and boiling above the vulcanization temperature, such as glycerine. This bath may contain a super-accelerator to effect surface vulcanization as an alternative to cold vulcanization. Alternatively, the lump of sponge rubber dough may be suspended on a wire or cord in a hot vulcanizing atmosphere, or it may be packed in a bed of light, bulky powder, such as magnesium carbonate.

However the tendency to form a flat base by the weight of the mass may be taken advantage of in making for instance rods of D section, or flat based rounded sponge rubber articles.

The pre-formation of a vulcanized surface on a mass of sponge rubber dough before generation therein of gas, can be utilized in the vulcanization of shaped rubber sponge articles in confining moulds, to avoid blemish to the surface of the finished article by preventing sticking to the mould and thereby avoiding dents due to trapped air, and blemish owing to the escape of gas from the mass before expansion thereof fully to occupy the mould. Such pre-surface-vulcanization can be effected either by cold vulcanization of the surface of the rough lump of sponge rubber before being placed in the mould, or by the presence of a super-accelerator, within the mould dusted on to the surface of the lump.

The size of sponge rubber articles such as cords, tubes and balls can be approximately pre-determined by standardizing the components and conditions to which they are subjected, and such articles can be graded after manufacture.

I claim:

1. A method of forming sponge rubber articles, consisting in surface vulcanizing a mass of rubber prepared for the formation of sponge rubber, and subsequently generating gas within and hot vulcanizing said surface-vulcanized mass.

2. A method of forming sponge rubber articles, consisting in cold vulcanizing the surface of a mass of rubber prepared for the formation of sponge rubber, and subsequently generating gas within and hot vulcanizing said surface-vulcanized mass.

3. A method of forming sponge rubber articles, consisting in subjecting the surface of a mass of rubber prepared for the formation of sponge rubber to the action of a super-accelerator at a temperature below the temperature of generation of gas within said mass, and subsequently generating gas within and hot vulcanizing said mass.

4. A method of forming sponge rubber articles of round section, consisting in supporting in a manner to avoid flattening a mass of rubber prepared for the formation of sponge rubber, surface vulcanizing said mass, and subsequently generating gas within and hot vulcanizing said surface-vulcanized mass.

5. A method of forming continuous lengths of sponge rubber articles of round section, consisting in surface vulcanizing and compactly disposing a continuous length of rubber prepared for the formation of sponge rubber, and subsequently generating gas within and hot vulcanizing said surface-vulcanized length.

6. A method of forming continuous hollow lengths of sponge rubber articles of round section consisting in surface vulcanizing, mounting on a core and compactly disposing a continuous length of rubber prepared for the formation of sponge rubber, and subsequently generating gas within and hot vulcanizing said surface-vulcanizing length.

7. A method of forming sponge rubber articles, consisting in surface vulcanizing a mass of rubber prepared for the formation of sponge rubber, and subsequently generating gas within and hot vulcanizing said surface-vulcanized mass in a mould.

8. A method of forming sponge rubber articles, consisting in cold vulcanizing the surface of a mass of rubber prepared for the formation of sponge rubber, and subsequently generating gas within and hot vulcanizing said surface-vulcanized mass in a mould.

9. A method of forming sponge rubber articles, consisting in subjecting the surface of a mass of rubber prepared for the formation of sponge rubber to the action of a super-accelerator at a temperature below the temperature of generation of gas within said mass, and subsequently generating gas within and hot vulcanizing said mass in a mould.

In testimony whereof I have signed my name to this specification.

REGINALD JAMIESON NOAR.